United States Patent Office 3,480,225
Patented Nov. 25, 1969

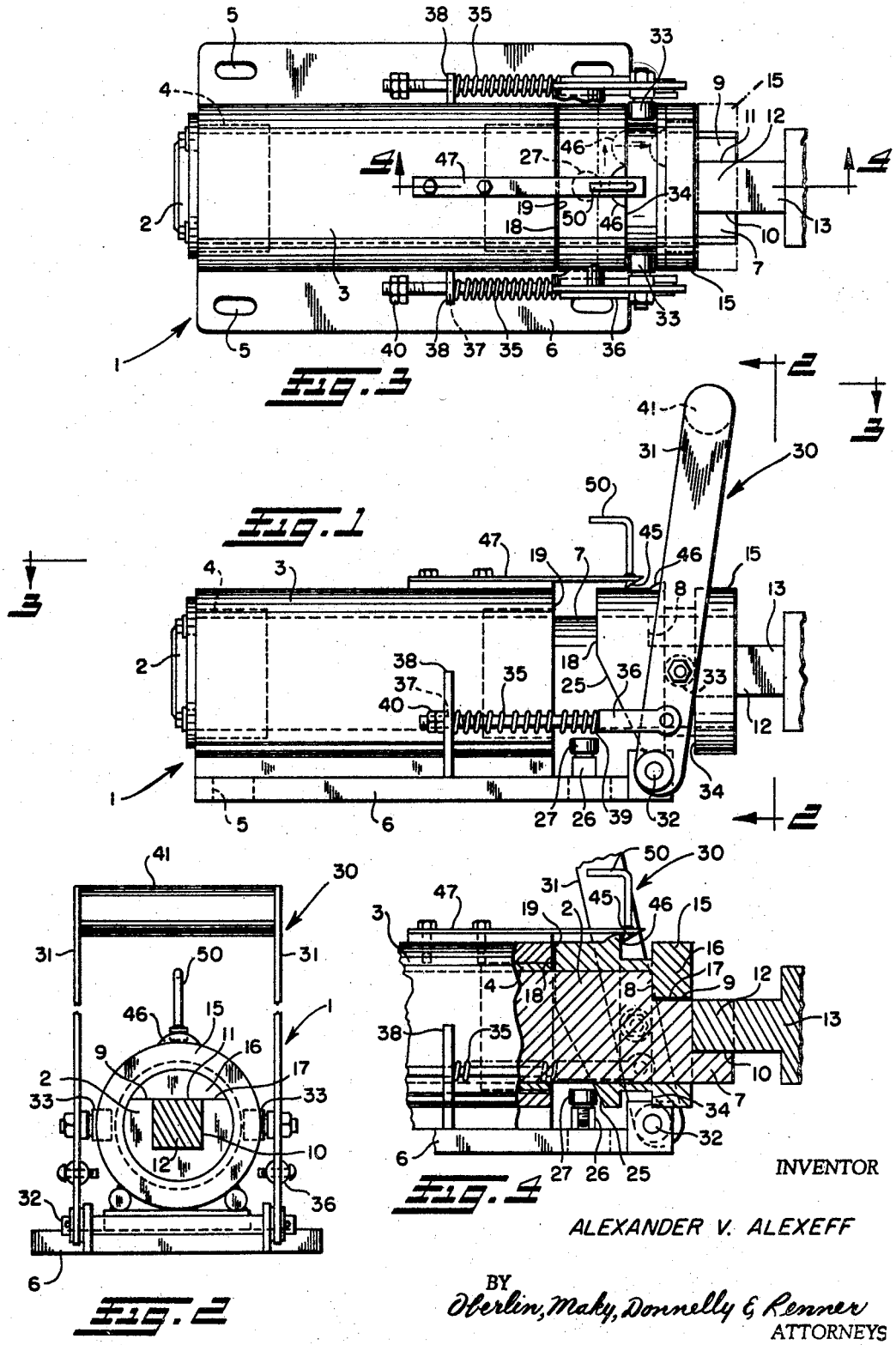

3,480,225
SELF-LOCKING CHUCK FOR ROLL SHAFTS
Alexander V. Alexeff, Cleveland, Ohio, assignor to Alexeff-Snyder Enterprises, Cleveland, Ohio, a corporation of Ohio
Filed Apr. 2, 1968, Ser. No. 718,119
Int. Cl. B65h 17/02
U.S. Cl. 242—68.4          9 Claims

ABSTRACT OF THE DISCLOSURE

A self-locking chuck having a rotatable support member with an open-sided socket in one end for receiving the end of a roll shaft, and an axially movable collar spring biased into a position overlying the socket to prevent accidental drop-out of the roll shaft. A latch mechanism positively holds the collar in the retracted position when the open side of the socket is facing upwardly until manually released or the collar is rotated beyond the limits of the latch. A stop having a rotatable cam follower thereon prevents retraction of the collar while the open side of the socket is facing downward without scoring the collar.

BACKGROUND OF THE INVENTION

This invention relates generally as indicated to a self-locking chuck for roll shafts and more particularly to certain improvements in chucks of the type disclosed in my earlier Patent No. 3,246,858, granted Apr. 19, 1966.

In such earlier patent, there is disclosed a chuck which is very well suited for mounting replaceable rolls in tire web processing lines and the like, since the chuck permits ready replacement of the rolls as often as required without danger of the rolls being accidentally disengaged from the chuck. This is due to the manner in which the roll shaft is held in an open-sided socket by an axially movable collar which can only be retracted when the open side of the socket is facing upwardly, thereby necessitating lifting of the roll to remove it from the socket.

Cooperating cam surfaces on the support stand and collar cause automatic closing of the collar over the open side of the socket upon rotation of the socket away from its upwardly facing position, whereby even though the collar may be accidentally left retracted by the operator after replacement of a roll, there is no danger of it falling out during rotation. However, considerable friction may develop as the collar is forced outwardly in this manner, especially if the collar is not moved to the fully extended position by the cams where it is normally held by a detent, and continues to drift back against a stop and forced outwardly again by engagement of the cam surfaces. Scoring of the collar by the stop may also take place. Moreover, the chances of the operator leaving the collar in the retracted position are great, since the collar must be bodily forced to the closed position by the operator, and he knows full well that the collar will close by itself without concerning himself with the damage that may result.

The chuck of the aforementioned patent also makes no provision for positively holding the collar in the retracted position during replacement of a roll, and accordingly should the operating handle or collar be accidentally bumped, the collar may prematurely close at least to an extent sufficient to preclude placement of a new roll in the chuck without first having to again retract the collar. Moreover, undesirable friction may develop during actuation of the collar due to the relatively heavy trunnion frame which is slidably received in an annular groove in the collar to provide a rototable connection between the collar and collar actuating handle.

SUMMARY OF THE INVENTION

With the foregoing in mind, it is a principal object of the present invention to provide a chuck of the type generally described, but having a collar which when moved to the retracted position, is positively held retracted by a latch mechanism until released or until the collar is rotated beyond the limits of the latch whereupon a spring automatically forces the collar to the closed position locking the shaft in place.

Another object is to provide such a chuck with a stop to prevent retraction of the collar while the socket is facing downward so that the roll cannot accidentally drop out of the socket, such stop being provided with a rotatable cam follower to prevent scoring of the collar by the stop.

A further object is to provide such a chuck with a handle having oppositely disposed rollers received in an annular groove in the collar for permitting axial movement of the collar by the handle without creating undue friction during relative rotation therebetween.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a side elevation view of a preferred form of self-locking chuck constructed in accordance with this invention, with the collar in the fully extended or closed position surrounding the end of a roll shaft received in the chuck;

FIG. 2 is an end elevation view of the chuck of FIG. 1 as seen from the right end of FIG. 1;, taken on the plane of the line 2—2 thereof;

FIG. 3 is a top plan view of the chuck of FIG. 1, as seen from the plane of the line 3—3, but showing the collar in the fully retracted position; and FIG. 4 is a fragmentary transverse section through the collar end of the chuck, taken on the plane of the line 4—4 of FIG. 3.

DESCRIPTION OF THE PREFERRED EMBODIMENT

Referring now in detail to the drawing, there is shown in the various figures a preferred form of chuck 1 having a rotatable support member 2 suitably journalled in a support stand 3 for rotation about a generally horizontal axis by a pair of axially spaced, heavy duty olite bearings 4. Mounting slots 5 may be provided in the base 6 of the support stand 3 to facilitate bolting or otherwise securing the support stand in place in a tire fabric processing line and the like.

One end of the rotatable support member 2 projects outwardly beyond the support stand 3 where it is stepped at 8 to provide a flat face 9 having an open-ended socket 10 of a generally square configuration with an open side 11 along the flat face 9 thus permitting ready insertion and removal of the similarly shaped end 12 of a replaceable roll shaft 13 such as may be found in tire web processing lines. An identical chuck 1 may also be provided for the other end of the roll shaft 13.

The end of the roll shaft 13 is normally retained in the socket 10 of the rotatable support member 2 by a collar 15 telescoped over the outer end of the support member 2 and provided with an inturned flange 16 having a flat inner face 17 closely adjacent to the flat face 9 which is adapted to overlie and thus close the open side 11 of the socket 10 when the collar 15 is in the fully extended or closed position shown in FIGS. 1 and 2. However, there is sufficient clearance between the inner end 18 of the collar 15 and the adjacent end 19 of the support stand 3 as well as between the inturned flange 16 on the collar 15 and shoulder 8 on the support member 2 to permit axial movement of the collar 15 to the retracted position shown in FIGS. 3 and 4 where the open side of the socket 10 is uncovered for removal of the roll shaft therefrom, but only when such open side is facing generally upwardly with the beveled portion 25 on the collar end 18 in alignment with the stop 26 on the base 6. For all other rotational positions of the collar 15, retraction of the collar is precluded by engagement of the inner end 18 of the collar with the stop 26, thus precluding accidental retraction of the collar while the socket 10 is facing downwardly which could result in acidental dropout of the roll shaft from the socket. A rotatable cam follower 27 on the stop 26 prevents scoring of the collar by the stop during rotation of the collar.

Manual retraction of the collar 15 may be achieved by pulling back on a handle 30 having a pair of arms 31 straddling the collar 15 with their lower ends pivotally connected to the base 6 of the support stand 3 as at 32, and a pair of guide rolls 33 carried by the arms 31 intermediate their ends which are received in opposite sides of an annular groove 34 in the collar. The guide rolls 33 permit rotation of the collar 12 with the rotatable support member 2 and roll shaft 13 held therein with very little friction while permitting arial movement of the collar from the closed or fully extended position of FIGS. 1 and 2 to the fully retracted position of FIGS. 3 and 4 and return through axial pivotal movements of the handle 30.

The handle 30 and thus the collar 15 are normally maintained in the fully extended position (FIGS. 1 and 2) by a pair of compression springs 35 which act on the arms 31 of the handle 30 through rod elements 36. One end of each rod element 36 is pivotally connected to an arm 31 of the handle 30, whereas the other end is of reduced diameter and extends through an aperture 37 in guide plates 38 attached to the base 6 adjacent opposite seides of the support stand 3. The springs 35 are telescoped over the reduced diameter portions of the rod elements where they are confined between a shoulder 39 on the rod elements and the guide plates 38. A pair of lock nuts 40 threaded onto the reduced end of the guide rods on the side of the guide plates 38 opposite the springs 35 limit the extent of forward movement of the collar 15 by the springs.

Assuming that the collar 15 is in the position shown in the drawing with the open side 11 of the socket 10 facing upwardly, the collar may be retracted by the operator grasping the handle grip 41 and pulling the handle 30 to the rear to the FIGS. 3 and 4 position where the collar will be retained in place by engagement of a latch mechanism 45 with a projection 46 on the collar 15. The latch mechanism 45 is desirably supported on the support stand 3 by a spring lever 47 which can be deflected during retraction of the collar 15 by the handle 30 to permit the latch mechanism 45 to ride up over the projection 46 into latching engagement therewith without having to manually actuate the latch mechanism.

The latch mechanism 45 will retain the collar 15 in the retracted position until manually released by lifting the latch handle 50 to clear the projection 46, or until the collar is rotated a few degrees to the phantom line position shown in FIG. 3 where the latch mechanism 45 is clear of the projection 46, thus permitting the springs 35 which were compressed during retraction of the collar to return the collar to the fully extended position. Accordingly, should the operator forget to release the collar after having replaced one roll with another, there is no danger of the roll dropping out of the chuck, since the collar will automatically close before the open side 11 of the socket 10 reaches a generally downward direction which would permit the roll shaft 13 to drop out of the socket. There is no danger of the chuck being damaged or of creating undesirable friction by letting the collar automatically return to the closed position, since there are no parts which are brought together to force the collar closed, this being accomplished by the springs 35 as aforesaid, and moreover, the springs positively retain the collar 15 in the closed position, thus preventing drifting of the collar with consequent banging of the collar against the stop 26.

From the above discussion, it can now be seen that the chuck of the present invention provides a very simple and effective means for supporting a roll shaft in such a manner that it may be readily replaced by movement of a collar to a retracted position where it is positively held in place, thus permitting the operator to use both hands in replacing the roll. Such chuck also provides for automatic locking of the roll shaft in place during subsequent rotation of the roll without creating undue friction or damaging the various parts of the chuck, and a stop member having a rotatable cam follower thereon prevents retraction of the collar except when the open side of the shaft receiving socket is facing upwardly so that the shaft cannot accidentally fall out.

I therefore, particularly point out and distinctly claim as my invention:

1. A chuck comprising a support stand, a rotatable support member journalled in said support stand for rotational movement about a horizontal axis, said rotatable support member having an open ended socket in one end with an open side for receipt of the end of a roll shaft and the like, a collar axially slidably movable on said one end of said rotatable support member between an extended position covering the open side of said socket to preclude the removal of a roll shaft inserted in said socket and a retracted position exposing the open end of said socket for removal and replacement of such roll shaft, said collar being rotatable with said support member, releasable latch means for positively retaining said collar in position when moved to the retracted position, and means for automatically returning said collar to the closed position upon release of said latch means.

2. The chuck of claim 1 wherein said latch means is engageable only when the open side of said socket is facing in a generally upward direction, said latch means being automatically released upon rotation of said socket beyond such generally upwardly facing direction.

3. The chuck of claim 2 wherein said collar has a projection thereon, and said latch means comprises a latch element carried by said support stand engageable with said projection on said collar, said projection being so oriented and of such a circumferential extent in relation to said latch element that said latch element clears said projection before the collar can be rotated to a position in which the open side of said socket faces generally downward to cause automatic closing of said collar thus to preclude accidental drop-out of a roll shaft contained in said socket.

4. The chuck of claim 3 further comprising a spring lever attached to said support stand and projecting outwardly therefrom for supporting said latch element, said spring lever being resiliently deformable to permit said latch element to ride up over said projection and into latching engagement therewith during retraction of said collar.

5. The chuck of claim 1 wherein said means for automatically returning said collar to the extended position comprises spring means for resiliently urging said collar toward the extended position.

6. The chuck of claim 5 further comprising a handle pivotally mounted to said support stand, and means interconnecting said handle and collar for effecting axial movement of said collar through pivotal movement of said handle while permitting relative rotation therebetween, said spring means acting through said handle to urge said collar to the extended position.

7. The chuck of claim 6 wherein said handle has a pair of arms straddling said collar and there are a pair of rod elements pivotally connected to said arms, guide plates on said support stand with apertures therein for extension of said guide elements therethrough, said spring means being telescoped over said rod elements and confined between said guide plates and arms, and means on the ends of said guide rods extending through said guide plates for locating said collar in the extended position by said spring means.

8. The chuck of claim 6 wherein said means for effecting axial movement of said collar by said handle while permitting relative rotation therebetween comprises a pair of arms on said handle straddling said collar, said collar having an annular groove, and guide rolls carried by said arms intermediate their ends which are received in opposite sides of said annular groove.

9. The chuck of claim 1 further comprising stop means for preventing retraction of said collar while the open side of said collar is facing downwardly thus preventing accidental drop-out of a roll shaft from said socket, and a rotatable cam follower on said stop means to prevent scoring of said collar by said stop means during rotation of said collar.

References Cited

UNITED STATES PATENTS

| | | | |
|---|---|---|---|
| 1,223,104 | 4/1917 | Pickett | 242—68.4 |
| 3,246,858 | 4/1966 | Alexeff | 242—68.4 |

NATHAN L. MINTZ, Primary Examiner